United States Patent
Fukuyama et al.

(10) Patent No.: US 8,432,648 B2
(45) Date of Patent: Apr. 30, 2013

(54) DISCHARGE DEVICE FOR VEHICLE

(75) Inventors: Takaki Fukuyama, Kiyosu (JP);
Shigeyuki Suzuki, Kiyosu (JP); Eiji Kitano, Toyota (JP)

(73) Assignees: Toyoda Gosei Co., Ltd., Aichi-pref. (JP); Toyoda Jidosha Kabushiki Kaisha, Aichi-pref. (JP)

( * ) Notice: Subject to any disclaimer, the term of this patent is extended or adjusted under 35 U.S.C. 154(b) by 63 days.

(21) Appl. No.: 13/229,847

(22) Filed: Sep. 12, 2011

(65) Prior Publication Data

US 2012/0063044 A1  Mar. 15, 2012

(30) Foreign Application Priority Data

Sep. 15, 2010 (JP) ................. 2010-206823

(51) Int. Cl.
*H02H 5/04* (2006.01)
*H02H 7/08* (2006.01)
*B60L 1/00* (2006.01)
*B60L 3/00* (2006.01)
*H02G 3/00* (2006.01)

(52) U.S. Cl.
USPC .......................................... 361/23; 307/10.1

(58) Field of Classification Search ............... 361/23; 307/10.1
See application file for complete search history.

(56) References Cited

U.S. PATENT DOCUMENTS

| | | | | |
|---|---|---|---|---|
| 6,097,107 A * | 8/2000 | Ikeda | | 307/10.7 |
| 8,111,026 B2 * | 2/2012 | Kitano | | 318/139 |
| 2002/0148242 A1 * | 10/2002 | Goto et al. | | 62/230 |
| 2009/0058339 A1 * | 3/2009 | Kitano | | 318/400.22 |
| 2009/0255744 A1 * | 10/2009 | Kitano | | 180/65.285 |
| 2010/0200377 A1 | 8/2010 | Arakawa | | |

FOREIGN PATENT DOCUMENTS

| | | |
|---|---|---|
| JP | A-H48-100663 | 12/1973 |
| JP | A-H59-41955 | 3/1984 |
| JP | A-H61-214723 | 9/1986 |
| JP | A-H61-189790 | 11/1986 |
| JP | 2005-327951 A | 11/2005 |
| JP | A-2006-081393 | 3/2006 |
| JP | 2006-141158 A | 6/2006 |
| JP | A-2006-224772 | 8/2006 |
| JP | A-2010-183803 | 8/2010 |

OTHER PUBLICATIONS

Notice of Allowance mailed Jul. 10, 2012 in corresponding JP Application No. 2010-206823.

* cited by examiner

*Primary Examiner* — Dharti Patel (74) *Attorney, Agent, or Firm* — Posz Law Group, PLC (57) ABSTRACT

A discharge device for a vehicle includes a discharging circuit that connects a second capacitor and a discharging resistor in parallel through activation of a forced connection device. When a collision of the vehicle is detected, the discharge device forcibly stops electricity supply from the storage battery to the electric circuit including the second capacitor, and activates the forced connection device to forcibly discharge the second capacitor. A pair of connecting terminals of the forced connection device are arranged to be pressed against each other with an insulating member disposed therebetween. The forced connection device includes a gas generator for generating combustion gas directed to the insulating member. When an abnormality is detected, the forced connection device short-circuits the connecting terminals with each other through activation of the gas generator. The second capacitor and the discharge device are provided integrally.

11 Claims, 7 Drawing Sheets

DISCHARGE DEVICE FOR VEHICLE

BACKGROUND OF THE INVENTION

The present invention relates to a discharge device employed in a vehicle that includes an electric circuit having capacitors. More specifically, the present invention relates to a discharge device that forcibly stops electricity supply to the electric circuit when an abnormality related to a collision is detected.

In recent years, in addition to vehicles that use an internal combustion engine as a drive source, there have been proposed hybrid vehicles, which have an internal combustion engine and an electric motor as drive sources, and electric vehicles and fuel cell vehicles, which have only an electric motor as a drive source. Such vehicles have an electric circuit that includes an electric motor for driving the vehicle, a drive circuit for driving the electric motor, and a storage battery for supplying electricity to the drive circuit.

A typical drive circuit has a converter circuit and an inverter circuit. The converter circuit raises the voltage supplied from the storage battery, and outputs the voltage to the inverter circuit. The inverter circuit converts the received direct-current electricity to an alternating-current, and delivers the electricity to the motor. The electric circuit also includes a capacitor for suppressing fluctuation of voltage supplied from the storage battery to the converter circuit and a capacitor for suppressing fluctuation of voltage supplied from the converter circuit to the inverter circuit.

In such vehicles, when an abnormality related to a collision is detected, the connection between the storage battery and the electric circuit is interrupted. This forcibly stops the electricity supply to the drive circuit, thereby stopping the operation of the electric motor.

In addition to such forcible stoppage of electricity supply, forcible discharging of the capacitors in the electric circuit has been proposed so as to prevent leakage from the electric circuit. For example, Japanese Laid-Open Patent Publication No. 2006-141158 discloses an operational control for an electric motor in which, when a vehicle collision is detected, the electric motor is controlled to operate without generating rotational torque. To perform the operational control, the charge (electricity) stored in the capacitors in the electric circuit is used. Through execution of the operational control of the electric motor, the capacitors are discharged. That is, the electricity stored in the electric circuit is released. Accordingly, leakage from the electric circuit is prevented.

To properly discharge the capacitors in the electric circuit in the device disclosed in the above publication, the elements of the electric circuit, such as the converter, the inverters, and the electric motor need to be functioning normally. Therefore, when the drive circuit or the electric motor fails to function due to, for example, a vehicle collision, the operational control of the electric motor cannot be properly executed. Thus, the electric motor cannot adequately consume electricity, and the capacitors therefore cannot be discharged.

Since the capacitors and the electric motor are at positions located away from each other in the device of the above publication, the paths connecting the capacitors and the electric motor to each other tend to be long. The connecting paths are therefore susceptible to influences from vehicle collisions. If any part of the connection paths is broken by the impact of a vehicle collision, the capacitors cannot be discharged.

As described above, according to the device of the publication, whether the capacitors can be discharged or not depends on the operational states of the drive circuit and the electric motor. Therefore, when an abnormality is detected and capacitors are discharged, the reliability of the operation is not necessarily sufficient. Thus, there is still room for improvement in this regard.

SUMMARY OF THE INVENTION

Accordingly, it is an objective of the present invention to provide a discharge device for a vehicle that reliably discharges capacitors when an abnormality related to a collision of a vehicle is detected.

To achieve the foregoing objective and in accordance with one aspect of the present invention, a discharge device for a vehicle is provided. The device is employed in a vehicle that includes an electric circuit having at least one capacitor and a storage battery as an electricity source for the electric circuit. The discharge device includes a forced connection device, a discharging resistor, and a discharging circuit. The forced connection device has a pair of terminals. When the forced connection device is activated, the pair of terminals are short-circuited with each other. The discharging resistor is connected in series with the forced connection device. The discharging circuit has a circuit structure that connects the at least one capacitor with the discharging resistor in parallel through activation of the forced connection device. When an abnormality related to a collision of the vehicle is detected, the discharge device forcibly stops electricity supply from the storage battery to the electric circuit, and activates the forced connection device to forcibly discharge the at least one capacitor through the discharging circuit. The forced connection device includes an insulating member and a gas generator. The insulating member is disposed between the pair of terminals with the pair of terminals being pressed against each other. The gas generator generates combustion gas directed to the insulating member. The forced connection device short-circuits the pair of terminals with each other by removing the insulating member through activation of the gas generator at detection of the abnormality. The at least capacitor and the discharging circuit are provided integrally.

In accordance with another aspect of the present invention, a vehicle is provided that includes an electric circuit having at least one capacitor, a storage battery as an electricity source for the electric circuit, and a discharge device for a vehicle. The discharge device for a vehicle includes a forced connection device, a discharging resistor, and a discharging circuit. The forced connection device has a pair of terminals. When the forced connection device is activated, the pair of terminals are short-circuited with each other. The discharging resistor is connected in series with the forced connection device. The discharging circuit has a circuit structure that connects the at least one capacitor with the discharging resistor in parallel through activation of the forced connection device. When an abnormality related to a collision of the vehicle is detected, the discharge device forcibly stops electricity supply from the storage battery to the electric circuit, and activates the forced connection device to forcibly discharge the at least one capacitor through the discharging circuit. The forced connection device includes an insulating member and a gas generator. The insulating member is disposed between the pair of terminals with the pair of terminals being pressed against each other. The gas generator generates combustion gas directed to the insulating member. The forced connection device short-circuits the pair of terminals with each other by removing the insulating member through activation of the gas generator at detection of the abnormality. The at least capacitor and the discharging circuit are provided integrally.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A discharge device for a vehicle according to one embodiment of the present invention will now be described.

Figure 1:
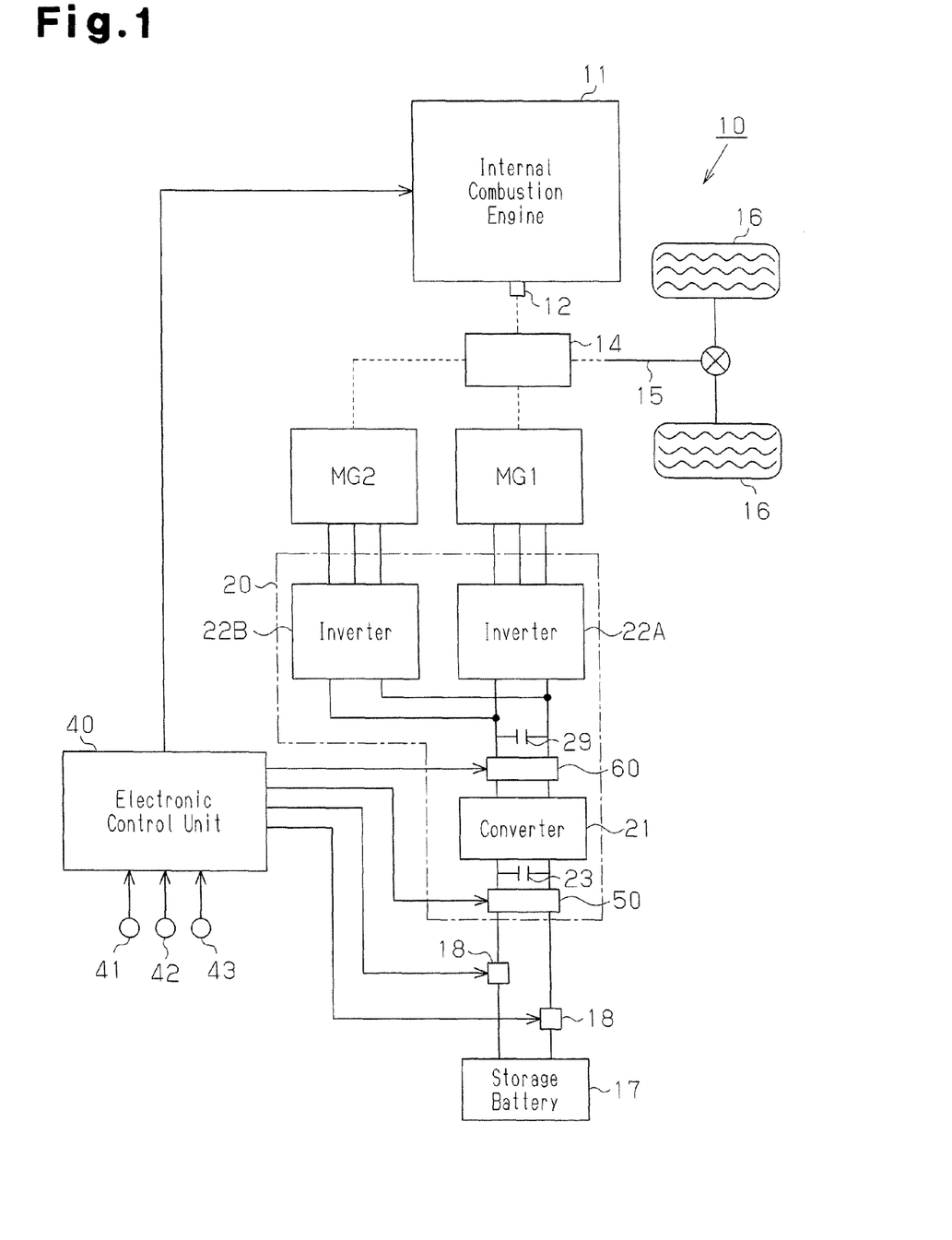
FIG. 1 is a diagram showing a vehicle on which a discharge device for a vehicle according to one embodiment of the present invention is mounted.

As shown in FIG. 1, a vehicle 10 mounts an internal combustion engine 11 serving as a power source. An output shaft 12 of the engine 11 is connected to an axle 15 via a first motor-generator MG1, a second motor-generator MG2, and a power transmission mechanism 14. Drive wheels 16 are coupled to the axle 15. The power transmission mechanism 14 is formed by a planetary gear mechanism. The power transmission mechanism 14 transmits rotational torque of the internal combustion engine 11 and the first and second motor-generators MG1, MG2 to the axle 15 and transmits rotational torque of the internal combustion engine 11 to the first motor-generator MG1. Three-phase alternating current motors are used as the first and second motor-generators MG1, MG2.

The vehicle 10 has a power control unit (PCU) 20, which controls the operation of the first and second motor-generators MG1, MG2. The PCU 20 has on-vehicle electric devices such as a converter 21 and inverters 22A, 22B. The converter 21 basically raises the voltage of electricity supplied from a storage battery 17, and outputs the electricity to the inverters 22A, 22B. The inverters 22A, 22B basically convert the input direct-current electricity into an alternating-current suitable for driving the first and second motor-generators MG1, MG2, and outputs the alternating-current electricity to the first and second motor-generators MG1, MG2, respectively.

The vehicle 10 has an electronic control unit (ECU) 40, which is constructed with a microcomputer as a dominant constituent. The ECU 40 is connected to various types of sensors. The various types of sensors include, for example, an acceleration pedal sensor 41 for detecting the amount of depression of the acceleration pedal (not shown), a speed sensor 42 for detecting the travel speed of the vehicle 10, and a collision sensor 43 for detecting presence or absence of an abnormality related to a collision of the vehicle 10 (the abnormality being a collision itself in the present embodiment).

The ECU 40 receives output signals from the various types of sensors, and performs various types of calculations based on the signals. Based on the calculation results, the ECU 40 executes various types of control related to the driving of the vehicle 10, for example, the control of the operation of the engine 11, the control of the operation of the converter 21 and the control of the operation of the inverters 22A, 22B.

The various types of control are executed basically according to the following concept.

For example, at starting of the vehicle 10 or during low load traveling, the driving efficiency of the engine 11 is lowered if the vehicle 10 is driven by the torque generated by the engine 11. In such a state, the second motor-generator MG2 is driven by the electricity supply from the storage battery 17. The vehicle 10 is driven by the torque generated by the second motor-generator MG2.

In a state where the engine 11 can operate at high efficiency, for example, during steady motion of the vehicle 10, the engine 11 is driven and the vehicle is 10 travels by the power of the engine 11. At this time, some of the power generated by the engine 11 is transmitted to the first motor-generator MG1, so that the first motor-generator MG1 generates electricity. The electricity generated by the first motor-generator MG1 drives the second motor generator MG2. This reduces the fuel consumption.

For acceleration of the vehicle 10, a great torque is required to drive the vehicle. In such a state, the engine 11 is driven and the generated torque is used to move the vehicle 10. At this time, the torque generated by the engine 11 is also transmitted to the first motor-generator MG1, so that the first motor-generator MG1 generates electricity. The generated electricity and the electricity supplied from the storage battery 17 drive the second motor-generator MG2. This allows the vehicle 10 to provide high acceleration performance.

For deceleration of the vehicle 10, the second motor-generator MG2 is forcibly rotated by the rotational torque applied by the drive wheels 16 and the axle 15. This causes the second motor-generator MG2 to generate electricity, by which the storage battery 17 is charged.

Figure 2:
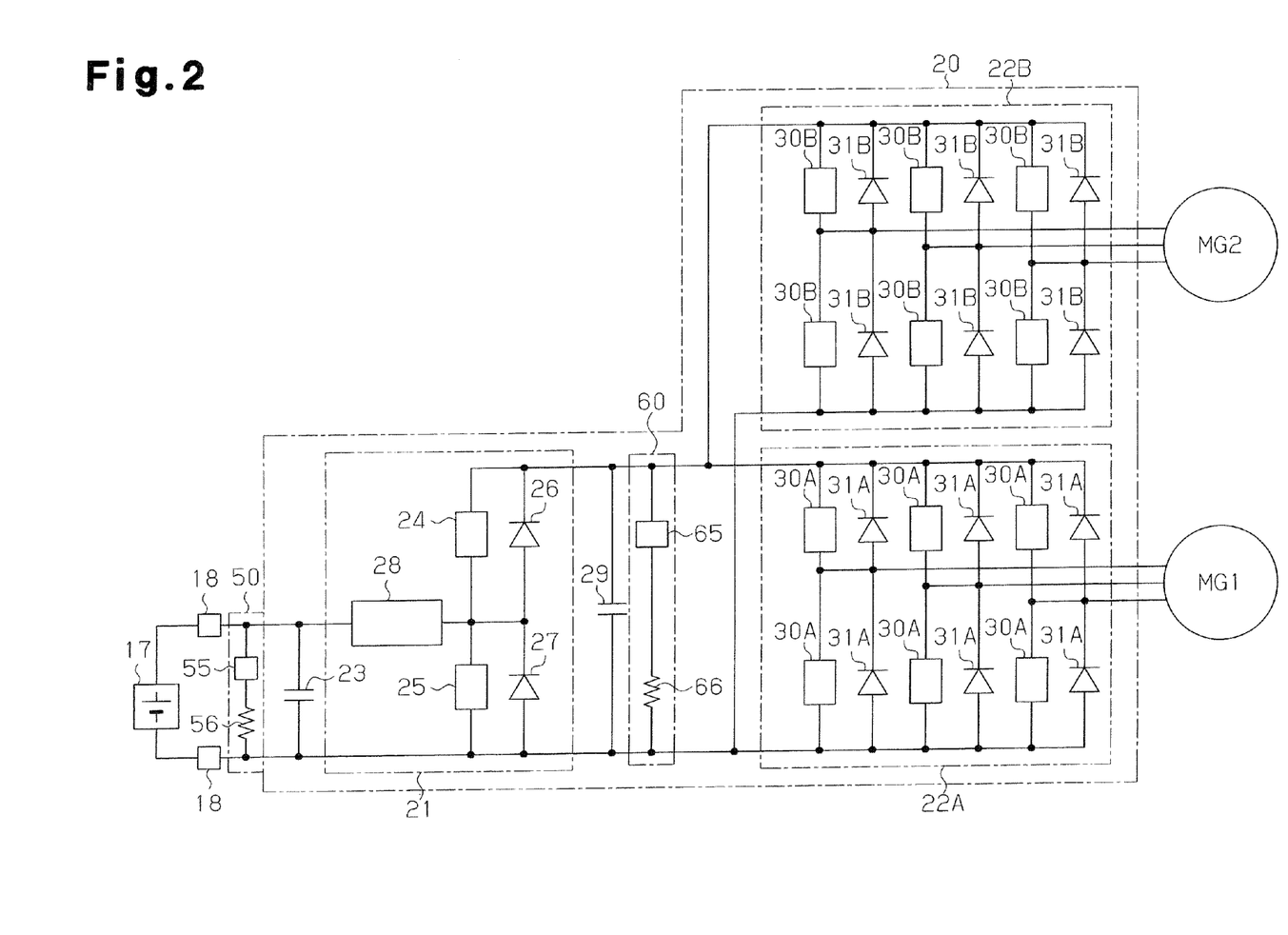
FIG. 2 is a circuit diagram showing the electric circuit of the vehicle according to the embodiment.

FIG. 2 shows an electric circuit including the first and second motor-generators MG1, MG2, the storage battery 17, and the PCU 20.

As shown in FIG. 2, the storage battery 17 is connected to the converter 21. A first capacitor 23 is provided between the positive terminal and the negative terminal of the storage battery 17. The input voltage of the converter 21 is applied to the first capacitor 23. The first capacitor 23 reduces fluctuation of voltage applied to the converter 21 by the storage battery 17.

The converter 21 includes two switching elements 24, 25 connected in series, specifically, two insulated-gate bipolar transistors. Diodes 26, 27 are connected in parallel with the switching elements 24, 25, respectively. The voltage of the storage battery 17, for example, 200 volt, is applied to one of the switching elements 24, 25. Specifically, the voltage of the storage battery 17 is applied to a point between the drain terminal and the source terminal of the switching element 25. The positive terminal of the storage battery 17 and the switching element 25 (specifically, the drain terminal of the switching element 25) are connected to each other via a reactor 28. Also, a second capacitor 29 is connected between the switching elements 24, 25, which are connected to each other in series. Specifically, the second capacitor 29 is connected between the drain terminal of the switching element 24 and the source terminal of the switching element 25.

In the control of the operation of the converter 21, the operation of the switching elements 24, 25 is controlled. Through this control, a voltage that is higher than the voltage of the storage battery 17, for example, 650 volts, is output to the point between the serially connected switching elements 24, 25, using the characteristics of the reactor 28. Fluctuation of the output voltage of the converter 21 is reduced by the second capacitor 29. In the present embodiment, the circuit formed by the switching elements 24, 25, the diodes 26, 27, and the reactor 28 functions as a converter circuit.

The output voltage of the converter 21 is input to the two inverters 22A, 22B. The inverter 22A has six switching elements 30A. Specifically, the inverter 22A has a three-phase bridge rectifier formed by insulated-gate bipolar transistors. The inverter 22A is connected to the first motor-generator MG1. Diodes 31A are each connected in parallel with a corresponding one of the switching elements 30A. Likewise, the inverter 22B has six switching elements 30B. Specifically, the inverter 22B has a three-phase bridge rectifier formed by insulated-gate bipolar transistors. The inverter 22B is connected to the second motor-generator MG2. Diodes 31B are each connected in parallel with a corresponding one of the switching elements 30B.

In the operation control of the inverters 22A, 22B, the operation of the switching elements 30A, 30B is controlled. Through the control, the direct-current electricity from the converter 21 is converted into an alternating-current electricity suitable for driving the first motor-generator MG1 (or the second motor-generator MG2), and supplied to the first motor-generator MG1 (or the second motor generator MG2). Also, the first and second motor-generators MG1, MG2 generate electricity. Through the operation control of the inverters 22A, 22B, the first and second motor-generators MG1, MG2 are each driven in a manner suitable for the driving state of the vehicle 10.

Figure 3A:
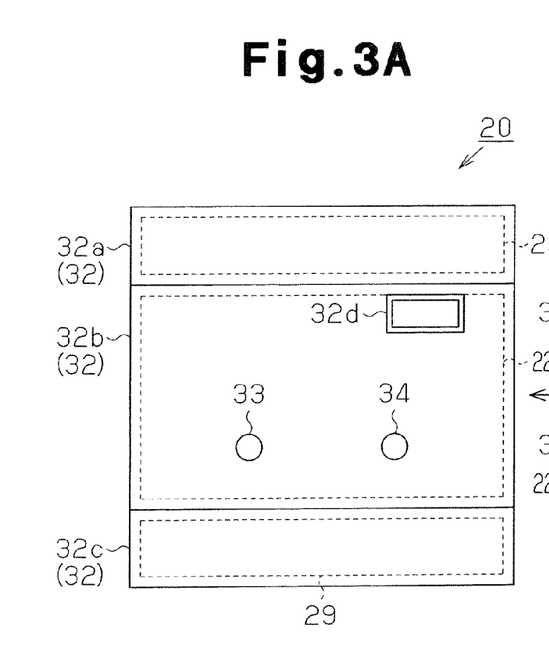
FIGS. 3A and 3B are side views showing a power control unit.
Figure 3B:
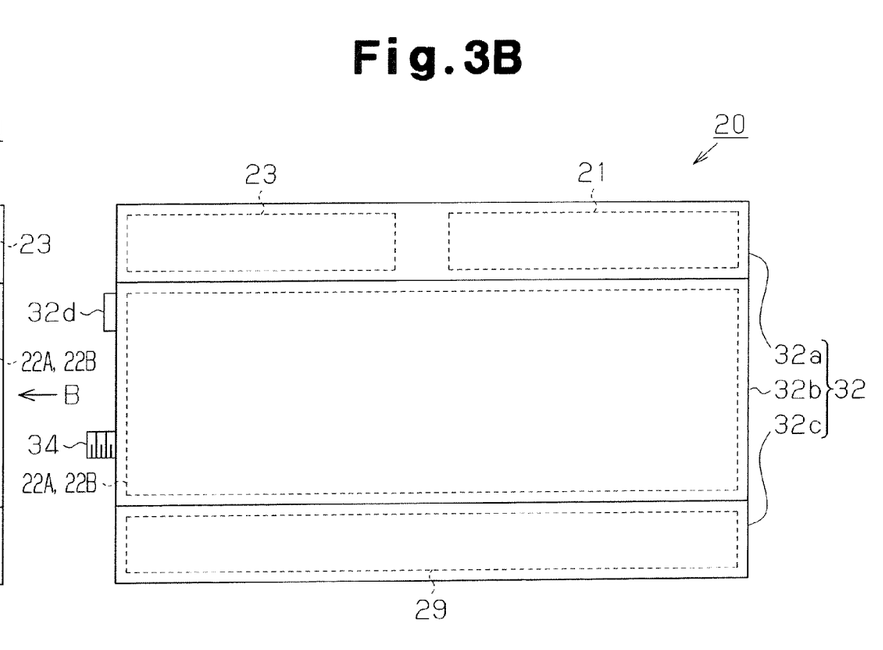

FIGS. 3A and 3B show a side structure of the PCU 20. FIG. 3B illustrates a side structure as viewed in the direction of arrow B in FIG. 3A.

As shown in FIGS. 3A and 3B, the PCU 20 has a dedicated case (hereinafter, referred to as a PCU case) 32 for accommodating circuit elements, such as the converter 21, the inverters 22A, 22B, the first capacitor 23, and the second capacitor 29. The PCU case 32 is divided into three cases, or an upper case 32a, a center case 32b, and a lower case 32c from the order from the upper side of the vehicle. The first capacitor 23 and the converter 21 are accommodated in the upper case 32a, the inverters 22A, 22B are accommodated in the center case 32b, and the second capacitor 29 is accommodated in the lower case 32c.

When the vehicle 10 is damaged by a collision, electric leakage (shorting) may occur from the electric circuit of the PCU 20. In a vehicle like the vehicle 10 as described above, which has, as drive sources, the internal combustion engine 11 and the first and second motor-generators MG1, MG2, the voltage applied to the electric circuit tends to be high. Therefore, prevention of electric leakage from the electric circuit is highly desirable. Accordingly, in the present embodiment, to prevent such leakage, a breaker 18 is provided that breaks the connection between the storage battery 17 and the PCU 20 in a collision of the vehicle 10. When a collision of the vehicle 10 is detected based on an output signal of the collision sensor 43, the breaker 18 is activated, so that the electricity supply from the storage battery 17 to the PCU 20 is forcibly stopped.

Also, the PCU 20 incorporates the first capacitor 23 and the second capacitor 29. Therefore, when the PCU 20 operates, specifically, when the PCU 20 receives the electricity supply from the storage battery 17, the first capacitor 23 and the second capacitor 29 are charged. Therefore, if the electricity supply from the storage battery 17 to each part of the PCU 20 is simply stopped by activation of the breakers 18, the voltage of the electric circuit of the PCU 20 is maintained to an unnecessarily high level.

In this regard, according to the present embodiment, the breaker 18 is activated when a detection of the vehicle 10 is detected to stop the supply of electricity supply from the storage battery 17 to the PCU 20. In addition, the first capacitor 23 and the second capacitor 29 are forcibly discharged. Specifically, the first capacitor 23 is discharged by the operation of a discharge device 50, and the second capacitor 29 is discharged by the operation of a discharge device 60. In the present embodiment, the discharge device 50 and the discharge device 60 function as discharging circuits.

Hereinafter, the specific structure of the discharge devices 50, 60 will be discussed.

First, the discharge device 60, which is used for discharging the second capacitor 29, will be described.

Figure 4:
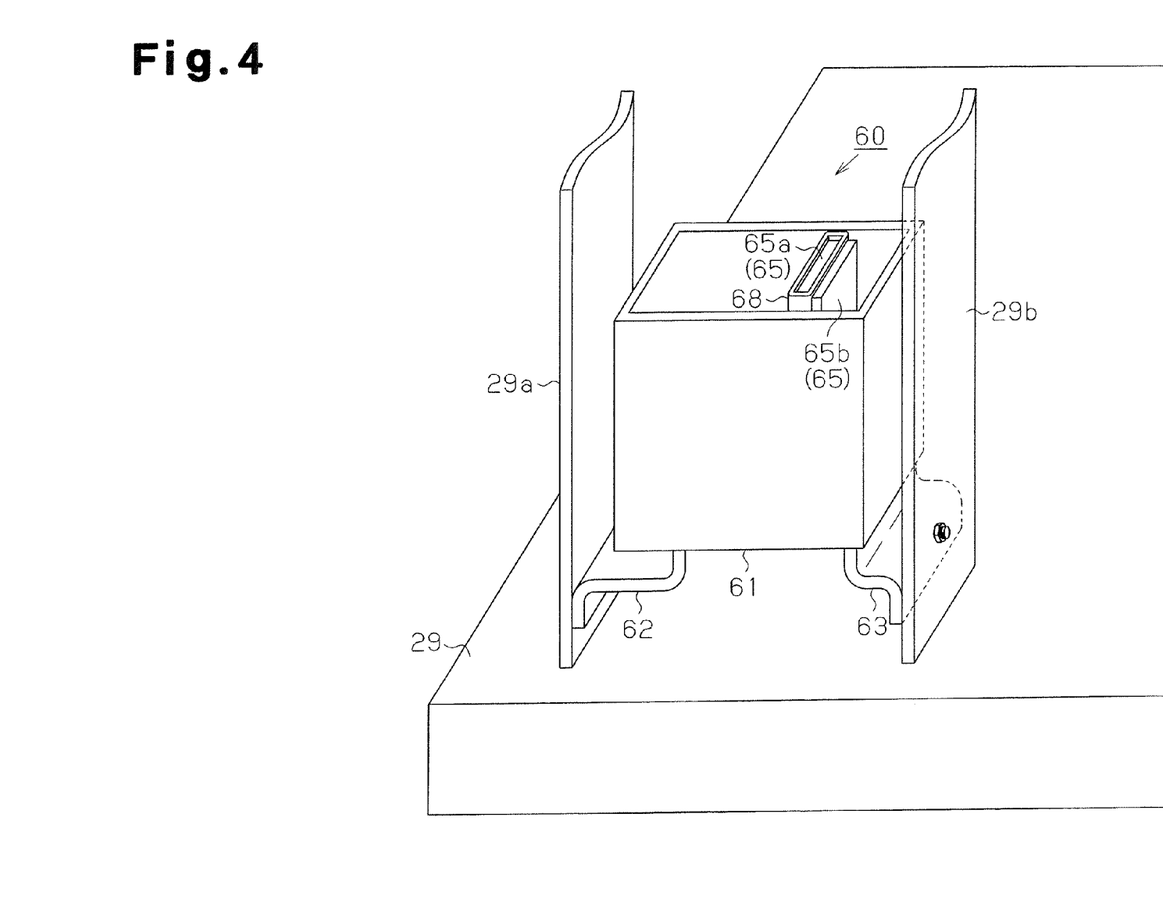
FIG. 4 is a perspective view showing a discharge device that corresponds to a second capacitor.
Figure 5:
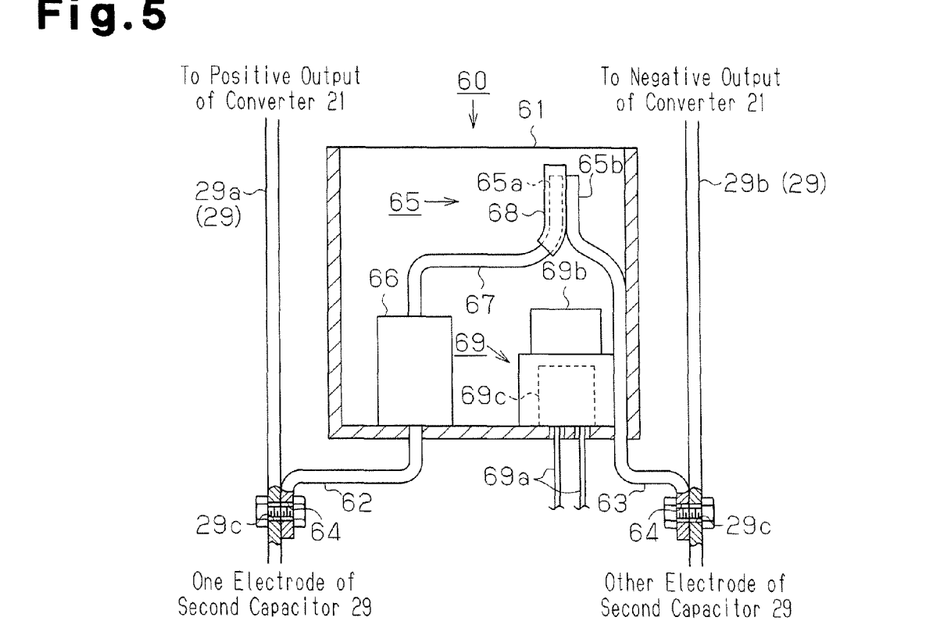
FIG. 5 is a cross-sectional view showing the inner structure of the discharge device.

FIG. 4 is a perspective view showing the second capacitor 29 and the discharge device 60 that corresponds to a second capacitor, and FIG. 5 is a cross-sectional view showing the inner structure of the discharge device 60.

As shown in FIGS. 4 and 5, the discharge device 60 includes a dedicated first case 61. The first case 61 has a first connection bus bar 62 and a second connection bus bar 63, which extend from the interior to the outside of the first case 61. On both sides of the first case 61, a first electrode bus bar 29a, which functions as a first bus bar, and a second electrode bus bar 29b, which functions as a second bus bar, are provided in an upright state. The first electrode bus bar 29a functions as a first bus bar, which forms one electrode of the second capacitor 29. The second electrode bus bar 29b functions as a second bus bar, which forms the other electrode of the second capacitor 29. Bus bars are formed by punching, into desired shapes, a conductive plate made of a highly electroconductive metal material (for example, copper, a copper alloy or brass) and bending the punched plates.

A through hole 64 is formed in an end of each of the first connection bus bar 62 and the second connection bus bar 63 that is exposed to the outside of the first case 61. Also, a through hole 29c is formed in each of the first electrode bus bar 29a and the second electrode bus bar 29b. Through bolt fastening using the through holes 29c, 64, the first connection bus bar 62 is fixed to the first electrode bus bar 29a and the second connection bus bar 63 is fixed to the second electrode bus bar 29b.

In this manner, the discharge device 60 is fixed to the first electrode bus bar 29a and the second electrode bus bar 29b so as to connect the first electrode bus bar 29a and the second electrode bus bar 29b to each other. In the present embodiment, the second capacitor 29 and the discharge device 60 are formed integrally.

A forced connection device 65 and a discharging resistor 66 are provided inside the first case 61. The forced connection device 65 has a pair of connecting terminals 65a, 65b, which are short-circuited when the forced connection device 65 is activated.

The discharging resistor 66 is arranged to connect the first connection bus bar 62 and a third connection bus bar 67 provided inside the first case 61 to each other. Specifically, the discharging resistor 66 is connected to an end of the first connection bus bar 62 that is located inside the first case 61 and an end of the third connection bus bar 67.

The forced connection device 65 is arranged to connect the second connection bus bar 63 and the third connection bus bar 67 to each other. More specifically, an end of the third connection bus bar 67 that is not connected to the discharging resistor 66 functions as the connecting terminal 65a of the forced connection device 65, and an end of the second connection bus bar 63 that is located inside the first case 61 functions as the connecting terminal 65b of the forced connection device 65.

An insulating member 68 is attached to the connecting terminal 65a of the forced connection device 65 to cover the entire periphery of the connecting terminal 65a. As the insulating member 68, an insulating member is employed that is formed of a flexible material is employed and wrapped about the connecting terminals 65a. The connecting terminals 65a, 65b of the forced connection device 65 are arranged in the first case 61 to be pressed against each other with the insulating member 68 in between by means of the elasticity of the second connection bus bar 63 and the third connection bus bar 67.

The forced connection device 65 includes a gas generator 69, which generates combustion gas. The gas generator 69 is connected to the ECU 40 via electric wires 69a, and is activated when receiving a command signal from the ECU 40 so as to generate combustion gas. The gas generator 69 has a cylindrical housing 69b with an upper opening and a gas generation portion 69c located in the housing 69b. The gas generator 69 is arranged in the first case 61 such that the opening of the housing 69b faces the insulating member 68 through a part between the second connection bus bar 63 and the third connection bus bar 67. In other words, the gas generator 69 is arranged in the first case 61 so as to generate combustion gas directed to the insulating member 68. In the present embodiment, the shapes of the second connection bus bar 63 and the third connection bus bar 67, and the arrangement of the gas generator 69 are determined such that the distance between the second connection bus bar 63 and the third connection bus bar 67 toward the gas generator 69 (specifically, the opening of the housing 69b). As the gas generation portion 69c, an explosive type is employed, which generates combustion gas by igniting and burning incorporated explosive. In general, an explosive type is quick to be activated, inexpensive and has a high operation reliability, compared to electromagnetic types such as electromagnetic switches. In the present embodiment, such an explosive type is employed as an actuation source of the forced connection device 65.

As described above, the forced connection device 65 is formed by the second connection bus bar 63, the third connection bus bar 67, the insulating member 68, and the gas generator 69. In the present embodiment, the forced connection device 65 and the discharging resistor 66 are connected in series with each other.

In the present embodiment, the second capacitor 29 and the discharge device 60 are formed integrally by, after attaching the discharge device 60 to the second capacitor 29, forming a coating member (not shown) having a shape covering substantially the entire outer surface of the discharge device 60 and the second capacitor 29. The coating member is formed of a hard resin material, more specifically, an epoxy resin. The first electrode bus bar 29a and the second electrode bus bar 29b of the second capacitor 29 and the electric wires 69a of the discharge device 60 extend from inside to outside of the coating member. The interior of the first case 61 of the discharge device 60 is exposed to the outside of the coating member. As long as a structure is employed that is capable of properly defining the flow of gas generated by the gas generator 69, the coating member may be formed to conceal the interior of the first case 61, that is, to have a shape that covers the entire outer surfaces of the first case 61 of the discharge device 60.

Hereinafter, the operation of the discharge device 60 will be described.

When no collision of the vehicle 10 is detected, the ECU 40 sends no command signal to the gas generator 69, so that the forced connection device 65 is not activated. Accordingly, the connecting terminal 65a and the connecting terminals 65b of the discharge device 60 are insulated from each other by the insulating member 68 (the state shown in FIG. 5), that the connecting terminals 65a and the connecting terminals 65b are not electrically connected to each other. Accordingly, the discharging resistor 66 is not connected in parallel with the second capacitor 29, and no discharging is executed by the discharging resistor 66.

Thereafter, when a collision of the vehicle 10 is detected, the ECU 40 outputs a command signal to activate the forced connection device 65, specifically, the gas generator 69, so that the gas generator 69 generates combustion gas.

Figure 6:
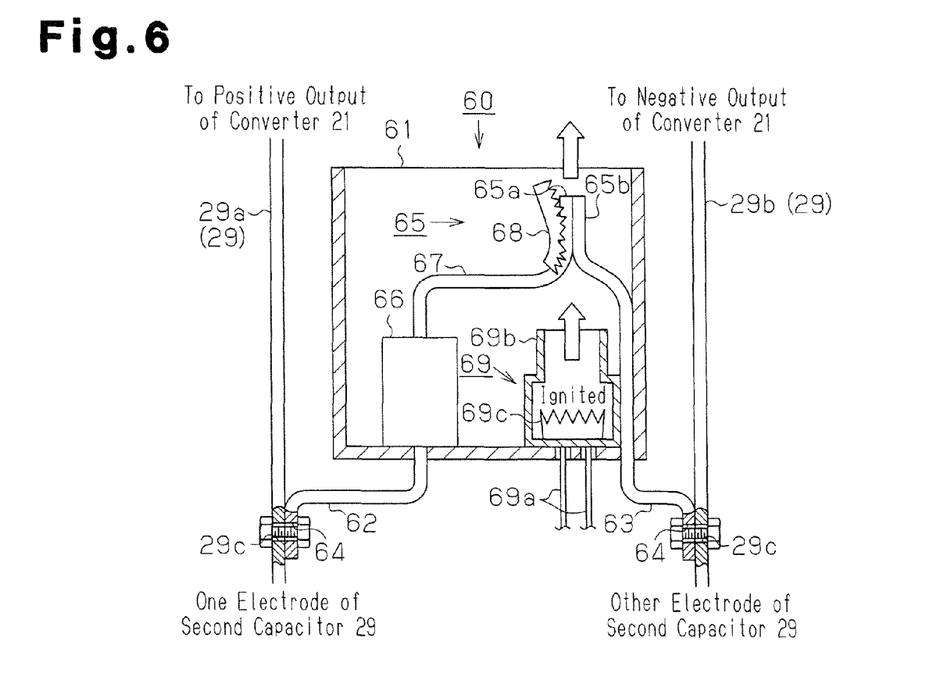
FIG. 6 is a cross-sectional view showing the inner structure of the discharge device.

FIG. 6 shows in the inner structure of the forced connection device 65 when activated. Arrows in FIG. 6 indicate the direction of flow of combustion gas.

When the gas generator 69 is activated and generates combustion gas as shown in FIG. 6, the combustion gas is discharged from the housing 69b of the gas generator 69. The discharged combustion gas is blown to the insulating member 68 provided between the connecting terminals 65a, 65b of the forced connection device 65. In the discharge device 60, the more separated from the gas generator 69, the shorter the distance between the second connection bus bar 63 and the third connection bus bar 67 becomes. Thus, the combustion gas is guided by the second connection bus bar 63 and the third connection bus bar 67. Accordingly, the combustion gas discharged from the gas generator 69 is reliably guided to the insulating member 68. Then, the blowing combustion gas breaks or thermally cuts the insulating member 68, so that at least part of the insulating member 68 is removed from the space between the connecting terminals 65a, 65b. As a result, the connecting terminals 65a, 65b contact each other and are short-circuited with each other.

As described above, according to the present embodiment, the operation of the gas generator 69 at the time when a collision of the vehicle 10 is detected short-circuits the connecting terminals 65a, 65b of the forced connection device 65. Accordingly, the discharging resistor 66 is connected in parallel with the second capacitor 29, so that the discharging resistor 66 discharges the second capacitor 29.

Hereinafter, the operation of the discharge device 60 will be described.

According to the present embodiment, regardless of the operational states of the elements of the electric circuit mounted on the vehicle 10, for example, the converter 21, the inverters 22A, 22B, and the first and second motor-generators MG1, MG2, the second capacitor 29 can be discharged by using only the discharge device 60, which is integrally formed with the second capacitor 29. Therefore, even when an impact is applied to the electric circuit due to, for example, a collision of the vehicle 10, discharging can be properly and highly reliably performed.

Further, since the second capacitor 29 and the discharge device 60 are formed integrally, the distance between the position of the second capacitor 29 and the position of the discharge device 60 is minimized. Particularly, the discharge device 60 is fixed to the first electrode bus bar 29a, which forms one electrode of the second capacitor 29, and the second electrode bus bar 29b, which forms the other electrode of the first electrode bus bar 29a. Therefore, the distance between the position of the second capacitor 29 and the position of the discharge device 60 is minimized. Accordingly, compared to a case where a second capacitor 29 and a discharge device 60 are formed as separate members and the distance therebetween is long, a collision of the vehicle 10 is less likely to break the lines connecting the second capacitor 29 and the discharge device 60 (specifically, the discharging resistor 66). Therefore, the second capacitor 29 can be discharged with a high reliability.

Hence, when a collision of the vehicle 10 is detected, the second capacitor 29 can be properly discharged.

Next, the discharge device 50, which is used for discharging the first capacitor 23, will be described.

Figure 7:
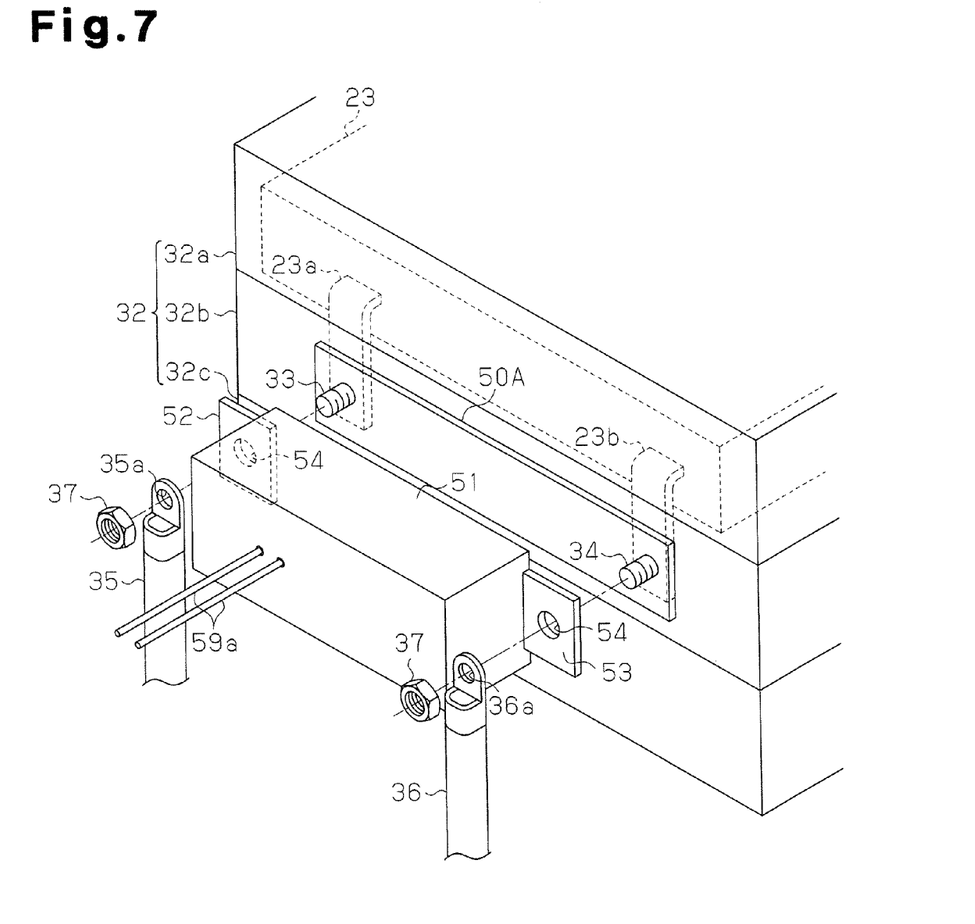
FIG. 7 is an exploded perspective view showing a discharge device that corresponds to a first capacitor and peripheral parts.

FIG. 7 illustrates a structure for attaching the discharge device 50 to the PCU case 32.

As shown in FIG. 7, the discharge device 50 includes a dedicated second case 51. The second case 51 has a fourth connection bus bar 52 and a fifth connection bus bar 53, which extend from the interior to the outside of the second case 51. A through hole 54 is formed in an end of each of the fourth connection bus bar 52 and the fifth connection bus bar 53 that is exposed to the outside of the second case 51.

A positive terminal 33 and a negative terminal 34 are integrally formed with the PCU case 32. The terminals 33, 34 each have a shape extending into and out of the PCU case 32. An external thread is formed on each of the positive terminal 33 and the negative terminal 34. In the present embodiment, the positive terminal 33 functions as a first terminal, and the negative terminal 34 functions as a second terminal.

Outside the PCU case 32, a positive cable 35 is secured to the positive terminal 33. The positive cable 35 is connected to the fourth connection bus bar 52 of the discharge device 50 and the positive terminal of the storage battery 17. Also, a negative cable 36 is secured to the negative terminal 34. The negative cable 36 is connected the fifth connection bus bar 53 of the discharge device 50 and the negative terminal of the storage battery 17. In this manner, according to the present embodiment, the discharge device 50 is fixed to the positive terminal 33 and the negative terminal 34 so as to connect the positive terminal 33 and the negative terminal 34 to each other. The positive cable 35 and the fourth connection bus bar 52 are fixed to the positive terminal 33 by inserting the positive terminal 33 into a through hole 35a formed in a connecting terminal of the positive cable 35 and the through hole 54 of the fourth connection bus bar 52, and fastening a nut 37 to the positive terminal 33. The negative cable 36 and the fifth connection bus bar 53 are fixed to the negative terminal 34 by inserting the negative terminal 34 into a through hole 36a formed in a connecting terminal of the negative cable 36 and the through hole 54 of the fifth connection bus bar 53, and fastening a nut 37 to the negative terminal 34.

An insulation plate 50A is between the discharge device 50 and the PCU case 32. The insulation plate 50A insulates the fourth connection bus bar 52 of the discharge device 50 and the PCU case 32 from each other, and the fifth connection bus bar 53 of the discharge device 50 and the PCU case 32 from each other.

Inside the PCU case 32, a third electrode bus bar 23a is secured to the positive terminal 33, and a fourth electrode bus bar 23b is secured to the negative terminal 34. The third electrode bus bar 23a serves as a first bus bar that forms one electrode of the first capacitor 23, and the fourth electrode bus bar 23b serves as a second bus bar that forms the other electrode of the first capacitor 23. The fixation of the third electrode bus bar 23a to the positive terminal 33 and the fixation of the fourth electrode bus bar 23b to the negative terminal 34 are done by fastening with nuts as the fixation of the cables 35, 36 to the terminals 33, 34.

As described above, in the present embodiment, the first capacitor 23 and the discharge device 50 are integrated with each other, with the PCU case 32 (specifically, the positive terminal 33 and the negative terminal 34 of the PCU case 32) in between.

Figure 8:
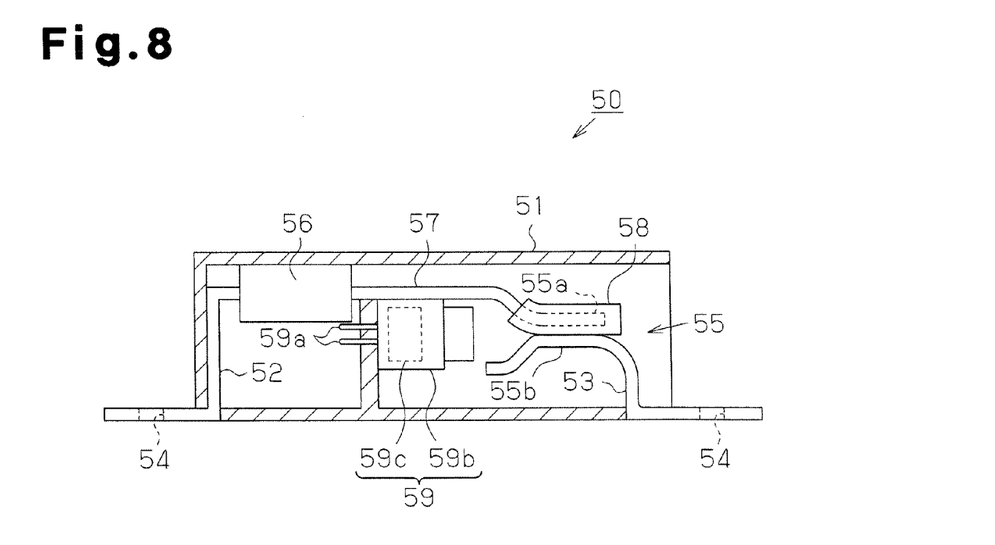
FIG. 8 is a cross-sectional view showing the inner structure of the discharge device.

FIG. 8 shows the inner structure of the discharge device 50.

As shown in FIG. 8, a forced connection device 55 and a discharging resistor 56 are accommodated in the second case 51. The forced connection device 55 has a pair of connecting terminals 55a, 55b, which are short-circuited when the forced connection device 55 is activated.

The discharging resistor 56 is arranged to connect the fourth connection bus bar 52 and a sixth connection bus bar 57, which are provided inside the second case 51, to each other. Specifically, the discharging resistor 56 is connected to an end of the fourth connection bus bar 52 that is located inside the second case 51 and to an end of the sixth connection bus bar 57.

The forced connection device 55 is arranged to connect the fifth connection bus bar 53 and the sixth connection bus bar 57 to each other. More specifically, an end of the sixth connection bus bar 57 that is not connected to the discharging resistor 66 functions as the connecting terminal 55a of the forced connection device 55, and an end of the fifth connection bus bar 53 that is located inside the second case 51 functions as the connecting terminal 55b of the forced connection device 55.

An insulating member 58 is attached to the connecting terminal 55a of the forced connection device 55 to cover the entire periphery of the connecting terminal 55a. As the insulating member 58, an insulating member is employed that is formed of a flexible material is employed and wrapped about the connecting terminals 65a. The connecting terminals 55a, 55b of the forced connection device 55 are arranged to be pressed against each other with the insulating member 58 in between, by means of the elasticity of the fifth connection bus bar 53 and the sixth connection bus bar 57.

The forced connection device 55 includes a gas generator 59, which generates combustion gas. A gas generator having the same structure as the above described gas generator 69 is used as the gas generator 59. The gas generator 59 is arranged in the second case 51 such that the opening of the housing 59b faces the insulating member 58 through a part between the fifth connection bus bar 53 and the sixth connection bus bar 57. In other words, the gas generator 59 is arranged in the second case 51 so as to generate combustion gas directed to the insulating member 58. In the present embodiment, the shapes of the fifth connection bus bar 53 and the sixth connection bus bar 57 and the arrangement of the gas generator 59 are determined such that the distance between the fifth connection bus bar 53 and the sixth connection bus bar 57 becomes longer toward the gas generator 59 (specifically, the opening of the housing 59b). A gas generation portion 59c of the gas generator 59 is connected to the ECU 40 via electric wires 59a. Specifically, the electric wires 59a are connected to the terminal of a connector 32d fixed to the PCU case 32 (see FIG. 3), and connected to the ECU 40 via the connector 32d As described above, the forced connection device 55 is formed by the fifth connection bus bar 53, the sixth connection bus bar 57, the insulating member 58, and the gas generator 59. In the present embodiment, the forced connection device 55 and the discharging resistor 56 are connected in series with each other.

Hereinafter, the operation of the discharge device 50 will be described.

When no collision of the vehicle 10 is detected, the ECU 40 sends no command signal to the gas generator 59, so that the forced connection device 55 is not activated. Accordingly, the connecting terminal 55a and the connecting terminals 55b of the discharge device 50 are insulated from each other by the insulating member 58 (the state shown in FIG. 8), that is, the connecting terminals 55a and the connecting terminals 55b are not electrically connected to each other. Accordingly, the discharging resistor 56 is not connected in parallel with the first capacitor 23, and no discharging is executed by the discharging resistor 56.

Thereafter, when a collision of the vehicle 10 is detected, the ECU 40 outputs a command signal to activate the forced connection device 55, specifically, the gas generator 59, so that the gas generator 59 generates combustion gas.

Figure 9:
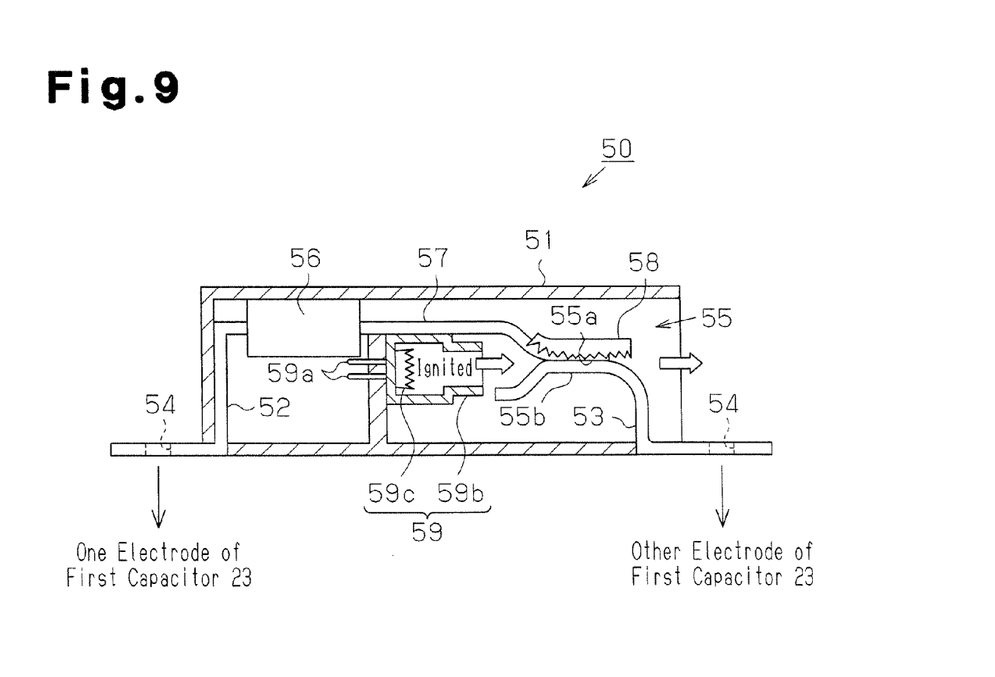
FIG. 9 is a cross-sectional view showing the inner structure of the discharge device.

FIG. 9 shows in the inner structure of the forced connection device 55 when activated. Arrows in FIG. 9 indicate the direction of flow of combustion gas.

When the gas generator 59 is activated and generates combustion gas as shown in FIG. 9, the combustion gas is discharged from the housing 59b of the gas generator 59. The discharged combustion gas is blown to the insulating member 58 provided between the connecting terminals 55a, 55b of the forced connection device 55. In the discharge device 50, the more separated from the gas generator 59, the shorter the distance between the fifth connection bus bar 53 and the sixth connection bus bar 57 becomes. Thus, the combustion gas is guided by the fifth connection bus bar 53 and the sixth connection bus bar 57. Accordingly, the combustion gas discharged from the gas generator 59 is reliably guided to the insulating member 58. Then, the blown combustion gas breaks or thermally cuts the insulating member 58, so that at least part of the insulating member 58 is removed from the space between the connecting terminals 55a, 55b. As a result, the connecting terminals 55a, 55b contact each other and are short-circuited with each other.

As described above, according to the present embodiment, the operation of the gas generator 59 at the time when a collision of the vehicle 10 is detected short-circuits the connecting terminals 55a, 55b of the forced connection device 55. Accordingly, the discharging resistor 56 is connected in parallel with the first capacitor 23, so that the discharging resistor 56 discharges the first capacitor 23.

Hereinafter, the operation of the discharge device 50 will be described.

According to the present embodiment, regardless of the operational states of the elements of the electric circuit mounted on the vehicle 10, for example, the converter 21, the inverters 22A, 22B, and the first and second motor-generators MG1, MG2, the first capacitor 23 can be discharged by using only the discharge device 50, which is integrally formed with the first capacitor 23. Therefore, even when an impact is applied to the electric circuit due to, for example, a collision of the vehicle 10, discharging can be properly and highly reliably performed.

Further, since the first capacitor 23 and the discharge device 50 are formed integrally, the distance between the position of the first capacitor 23 and the position of the discharge device 50 is minimized. Therefore, the distance between the position of the first capacitor 23 and the position of the discharge device 50 is minimized. Accordingly, compared to a case where a first capacitor 23 and a discharge device 50 are formed as separate members and the distance therebetween is long, a collision of the vehicle 10 is less likely to break the lines connecting the first capacitor 23 and the discharge device 50 (specifically, the discharging resistor 56). Therefore, the first capacitor 23 can be discharged with a high reliability.

Hence, when a collision of the vehicle 10 is detected, the first capacitor 23 can be properly discharged.

The first capacitor 23 and the discharge device 50 are assembled integrally by using the PCU case 32 accommodating the first capacitor 23 and terminals formed on the PCU case 32 (specifically, the positive terminal 33 and the negative terminal 34). This facilitates the assembly of the discharge device 50.

As described above, the present embodiment has the following advantages.

(1) The first capacitor 23 and the discharge device 50 are provided integrally. The second capacitor 29 and the discharge device 60 are also provided integrally. Therefore, even when an impact is applied to the electric circuit due to an collision of the vehicle, the first capacitor 23 and the second capacitor 29 can be properly and highly reliably discharged. Further, paths connecting the first capacitor 23 and the discharge device 50 to each other and paths connecting the second capacitor 29 and the discharge device 60 to each other are less likely to be broken due to a collision of the vehicle 10. Therefore, the first capacitor 23 and the second capacitor 29 can be discharged with a high reliability. Hence, when a collision of the vehicle 10 is detected, the first capacitor 23 and the second capacitor 29 can be properly discharged.

(2) The discharge device 60 is fixed to the first electrode bus bar 29a and the second electrode bus bar 29b so as to connect the first electrode bus bar 29a, which forms one electrode of the second capacitor 29, and the second electrode bus bar 29b, which forms the other electrode, to each other. Accordingly, the distance between the position of the second capacitor 29 and the position of the discharge device 60 is minimized. Therefore, the paths connection these are less likely to be broken by a collision of the vehicle 10. Therefore, the second capacitor 29 can be discharged with a high reliability.

(3) The discharge device 50 is fixed to the positive terminal 33 and the negative terminal 34 so as to connect the positive terminal 33 and the negative terminal 34 to each other. The positive terminal 33 is formed on the PCU case 32, and one terminal of the first capacitor 23 is fixed to the positive terminal 33. The negative terminal 34 is formed on the PCU case 32, and the other terminal of the first capacitor 23 is fixed to the negative terminal 34. The first capacitor 23 and the discharge device 50 are assembled integrally by using the PCU case 32 accommodating the first capacitor 23 and terminals formed on the PCU case 32. This facilitates the assembly of the discharge device 50.

(4) In the vehicle 10, which is a hybrid vehicle, the voltage applied to the electric circuit tends to be high. Therefore, prevention of electric leakage from the electric circuit is highly desirable. Even in such a vehicle 10, the first capacitor 23 and the second capacitor 29 are reliably discharged at a collision, so that electric leakage from the mounted electric circuit is reliably prevented.

The above described embodiment may be modified as follows.

Instead of integrating the discharge device 50 with the first capacitor 23, a discharge device having a similar circuit structure as the discharge device 60 may be integrated with the first capacitor 23.

Only one of the discharge device 50 and the discharge device 60 may be provided. That is, in the above described embodiment, either the discharge device 50 or the discharge device 60 may be omitted.

In the above described embodiment, the first connection bus bar 62 is fixed to the first electrode bus bar 29a, and the second connection bus bar 63 is fixed to the second electrode bus bar 29b. Instead of this configuration, the first electrode bus bar 29a and the first connection bus bar 62 may be formed integrally. Also, the second electrode bus bar 29b and the second connection bus bar 63 may be formed integrally.

The fixation of the cables 35, 36 to the PCU case 32 does not need to be done by bolt fastening, but may be done by a pair of connectors. The cables 35, 36 are connected to one of the connectors, and the other connector is fixed to the PCU case 32. The cables 35, 36 are fixed to the PCU case 32 by connecting the connectors to each other. An extension connector to be sandwiched between the connectors may be added. The extension connector may function as the discharge device 60.

The discharge device 50 and the PCU case 32 may be formed integrally in advance, for example, by using a structure in which the second case 51 is embedded in the side wall of the PCU case 32. Also, the discharge device 60 and the PCU case 32 may be formed integrally in advance, for example, by using a structure in which the first case 61 is embedded in the side wall of the PCU case 32.

The insulating members 58, 68 may have, in parts thereof, weakened portions having a lower strength than the other parts. According to this configuration, desired parts of the insulating members 58, 68, that is, the weakened portions can be reliably broken or thermally cut by combustion gas generated by the gas generators 59, 69. Accordingly, the insulating members 58, 68 can be efficiently removed from the space between the connecting terminals 55a, 55b and from the space between the connecting terminals 65a, 65b.

The housing 59b of the gas generator 59 may have a shape that extends to the periphery of the insulating member 58. Also, the housing 69b of the gas generator 69 may have a shape that extends to the periphery of the insulating member 68. This configuration allows combustion gas generated by the gas generators 59, 59 to be efficiently blown onto the insulating members 58, 68. Accordingly, the insulating members 58, 68 are removed efficiently.

The arrangement of the insulating members 58, 68 may be changed as necessary as long as the following conditions (1) to (3) are met.

Condition (1): When the gas generators 59, 69 are not activated, the connecting terminals 55a, 55b of the forced connection device 55 are reliably insulated from each other by an insulating member, and the connecting terminals 65a, 65b of the forced connection device 65 are reliably insulated from each other by an insulating member.

Condition (2): When the gas generators 59, 69 are not activated, an insulating member is reliably held between the connecting terminals 55a, 55b of the forced connection device 55, and another insulating member is reliably held between the connecting terminals 65a, 65b of the forced connection device 65.

Condition (3): At least part of an insulating member can be removed from the space between the connecting terminals 55a, 55b of the forced connection device 55, and at least part of an insulating member can be removed from the space between the connecting terminals 65a, 65b of the forced connection device 65 by combustion gas generated by the gas generators 59, 69.

Possible arrangements of insulating members include the one in which an insulating member is bonded to one of the connecting terminals 55a, 55b and to one of the connecting terminals 65a, 65b, and the one which an insulating member is tightly held between the connecting terminals 55a, 55b and between the connecting terminals 65a, 65b. The insulating members do not need to be sheets made of flexible material, but may be blocks made of a hard material.

In the above illustrated embodiments, the time at which the collision sensor 43 detects a collision of the vehicle 10 is defined as the time of detection of an abnormality. However, the time at which a vehicle collision is predicted may be defined as the time of abnormality detection. Specifically, the relative speed between an obstacle and the vehicle 10 and the distance between the obstacle and the vehicle 10 are detected first. Such detection can be executed by a known sensor such as a millimeter-wave radar, for example. When, based on the relative speed and the distance, it is determined that a collision between the vehicle 10 and the obstacle is inevitable, an abnormality related to the collision of the vehicle, specifically, an abnormality related to the prediction of the collision, is detected.

The present invention may be applied to an electric circuit having no converter circuit. Also, the present invention may be applied to an electric circuit that includes a direct-current motor for driving a vehicle and a drive circuit (for example, a chopper control circuit) for adjusting a direct-current electricity supplied to the motor. Further, the present invention may be applied not only to an electric circuit including a vehicle driving electric motor and a drive circuit for driving the motor, but also to any electric circuit including any on-vehicle electric devices. In short, the present invention may be applied to any vehicle that has an electric circuit with capacitors.

The discharge device for a vehicle according to the present invention may be applied not only to a hybrid vehicle, but also an electric vehicles or a fuel cell vehicle.

Therefore, the present examples and embodiments are to be considered as illustrative and not restrictive and the invention is not to be limited to the details given herein, but may be modified within the scope and equivalence of the appended claims.

The invention claimed is:

1. A discharge device for a vehicle, the device being employed in a vehicle that includes an electric circuit having at least one capacitor and a storage battery as an electricity source for the electric circuit, the discharge device comprising:
   a forced connection device having a pair of terminals, wherein, when the forced connection device is activated, the pair of terminals are short-circuited with each other;
   a discharging resistor that is connected in series with the forced connection device; and
   a discharging circuit having a circuit structure that connects the at least one capacitor with the discharging resistor in parallel through activation of the forced connection device,
   wherein
   when an abnormality related to a collision of the vehicle is detected, the discharge device forcibly stops electricity supply from the storage battery to the electric circuit, and activates the forced connection device to forcibly discharge the at least one capacitor through the discharging circuit,
   the forced connection device includes:
   an insulating member that is disposed between the pair of terminals with the pair of terminals being pressed against each other; and
   a gas generator for generating combustion gas directed to the insulating member, the forced connection device short-circuits the pair of terminals with each other by removing the insulating member through activation of the gas generator at detection of the abnormality, and the at least capacitor and the discharging circuit are provided integrally.

2. The discharge device for a vehicle according to claim 1, wherein the at least one capacitor includes a first bus bar forming a first electrode and a second bus bar forming a second electrode, and the discharging circuit is connected to the first bus bar and the second bus bar so as to connect the first bus bar and the second bus bar with each other.

3. The discharge device for a vehicle according to claim 1, wherein the at least one capacitor includes a first bus bar forming a first electrode and a second bus bar forming a second electrode, and the discharge device further comprises:

a case for accommodating the at least one capacitor;

a first terminal formed integrally with the case, the first bus bar being fixed to the first terminal; and a second terminal formed integrally with the case, the second bus bar being fixed to the second terminal, the discharging circuit is connected to the first terminal and the second terminal so as to connect the first terminal and the second terminal with each other.

4. The discharge device for a vehicle according to claim 1, wherein the pair of terminals are formed such that the distance between the pair of terminals increases toward the gas generator.

5. The discharge device for a vehicle according to claim 1, wherein the gas generator is arranged to face the insulating member.

6. The discharge device for a vehicle according to claim 1, wherein the insulating member covers the entire periphery of one of the pair of terminals, thereby insulating the terminals from each other.

7. The discharge device for a vehicle according to claim 1, wherein the electric circuit includes a converter circuit for increasing the voltage input from the storage battery, and the at least one capacitor includes at least one of a first capacitor to which input voltage of the converter circuit is applied and a second capacitor to which an output voltage of the converter circuit is applied.

8. The discharge device for a vehicle according to claim 1, wherein the electric circuit an electric motor for driving the vehicle and a drive circuit for driving the electric motor.

9. A vehicle comprising:

an electric circuit having at least one capacitor;

a storage battery as an electricity source for the electric circuit; and a discharge device for a vehicle, wherein the discharge device for a vehicle includes:

a forced connection device having a pair of terminals, wherein, when the forced connection device is activated, the pair of terminals are short-circuited with each other;

a discharging resistor that is connected in series with the forced connection device; and a discharging circuit having a circuit structure that connects the at least one capacitor with the discharging resistor in parallel through activation of the forced connection device, when an abnormality related to a collision of the vehicle is detected, the discharge device forcibly stops electricity supply from the storage battery to the electric circuit, and activates the forced connection device to forcibly discharge the at least one capacitor through the discharging circuit, the forced connection device includes:

an insulating member that is disposed between the pair of terminals with the pair of terminals being pressed against each other; and a gas generator for generating combustion gas directed to the insulating member, the forced connection device short-circuits the pair of terminals with each other by removing the insulating member through activation of the gas generator at detection of the abnormality, and the at least capacitor and the discharging circuit are provided integrally.

10. The vehicle according to claim 9, wherein the electric circuit includes a converter circuit for increasing the voltage input from the storage battery, and the at least one capacitor includes at least one of a first capacitor to which input voltage of the converter circuit is applied and a second capacitor to which an output voltage of the converter circuit is applied.

11. The vehicle according to claim 9, wherein the electric circuit an electric motor for driving the vehicle and a drive circuit for driving the electric motor.

* * * * *

UNITED STATES PATENT AND TRADEMARK OFFICE
CERTIFICATE OF CORRECTION

PATENT NO. : 8,432,648 B2  
APPLICATION NO. : 13/229847  
DATED : April 30, 2013  
INVENTOR(S) : Fukuyama et al.

Page 1 of 1

It is certified that error appears in the above-identified patent and that said Letters Patent is hereby corrected as shown below:

<u>Title page, item 73</u>

Assignees: should read -- TOYODA GOSEI CO., LTD., Aichi-pref., Japan -- and
-- TOYOTA JIDOSHA KABUSHIKI KAISHA, Aichi-pref., Japan --

Signed and Sealed this
Third Day of September, 2013

Teresa Stanek Rea
*Acting Director of the United States Patent and Trademark Office*